Figure 1:
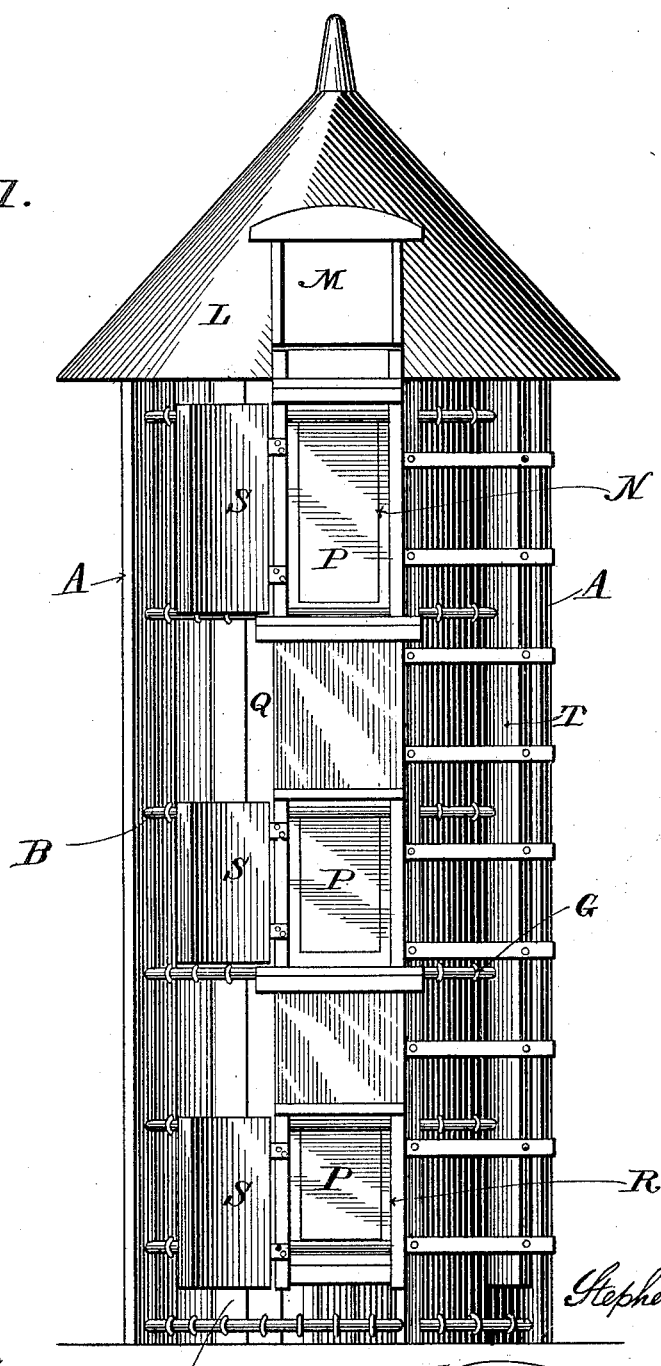

No. 699,602. Patented May 6, 1902.
S. P. WHITE.
SILO.
(Application filed Apr. 26, 1901.)
(No Model.) 3 Sheets—Sheet 1.

No. 699,602. Patented May 6, 1902.
S. P. WHITE.
SILO.
(Application filed Apr. 26, 1901.)
(No Model.) 3 Sheets—Sheet 2.
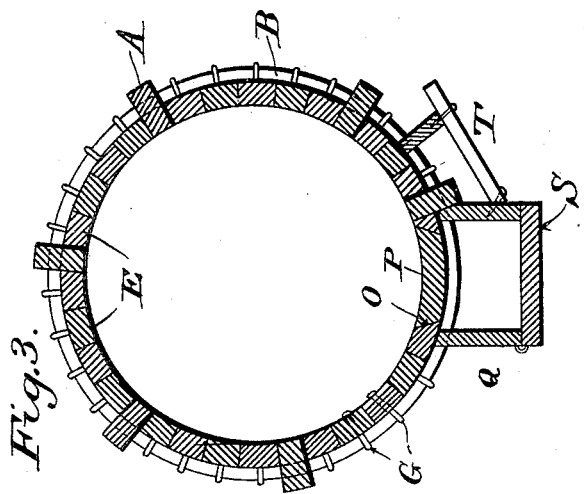
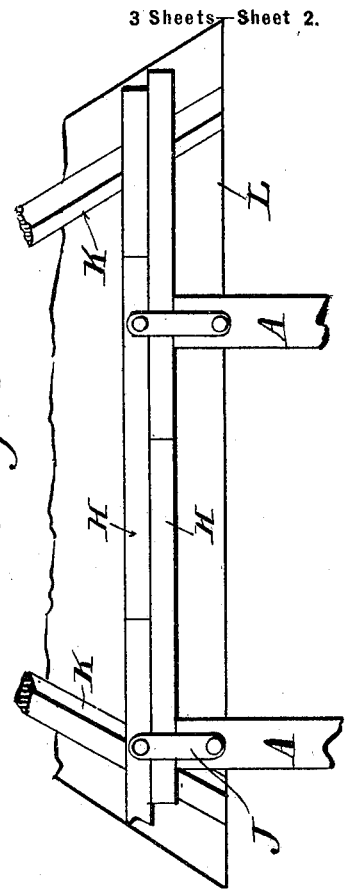
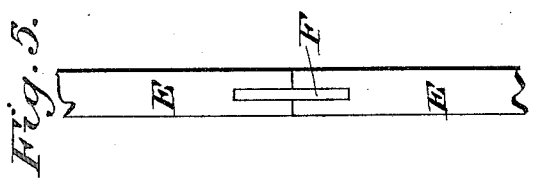
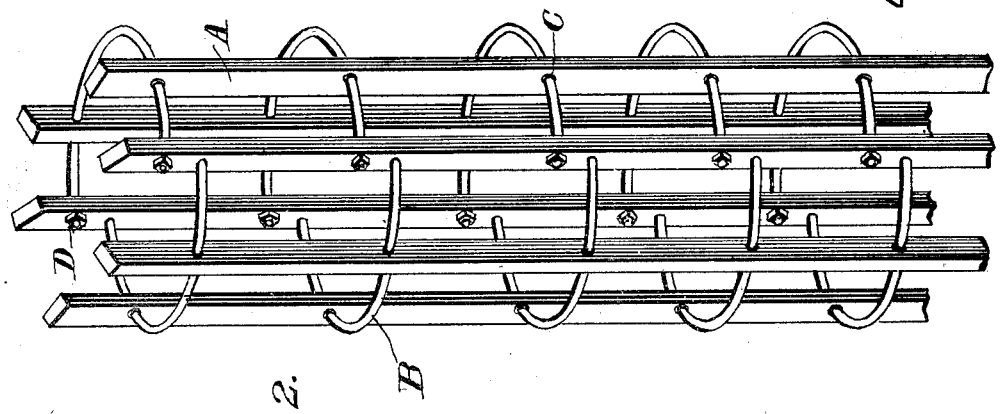
Witnesses
Stephen P. White.
Inventor
Attorney No. 699,602. Patented May 6, 1902.
S. P. WHITE.
SILO.
(Application filed Apr. 26, 1901.)
(No Model.) 3 Sheets—Sheet 3.
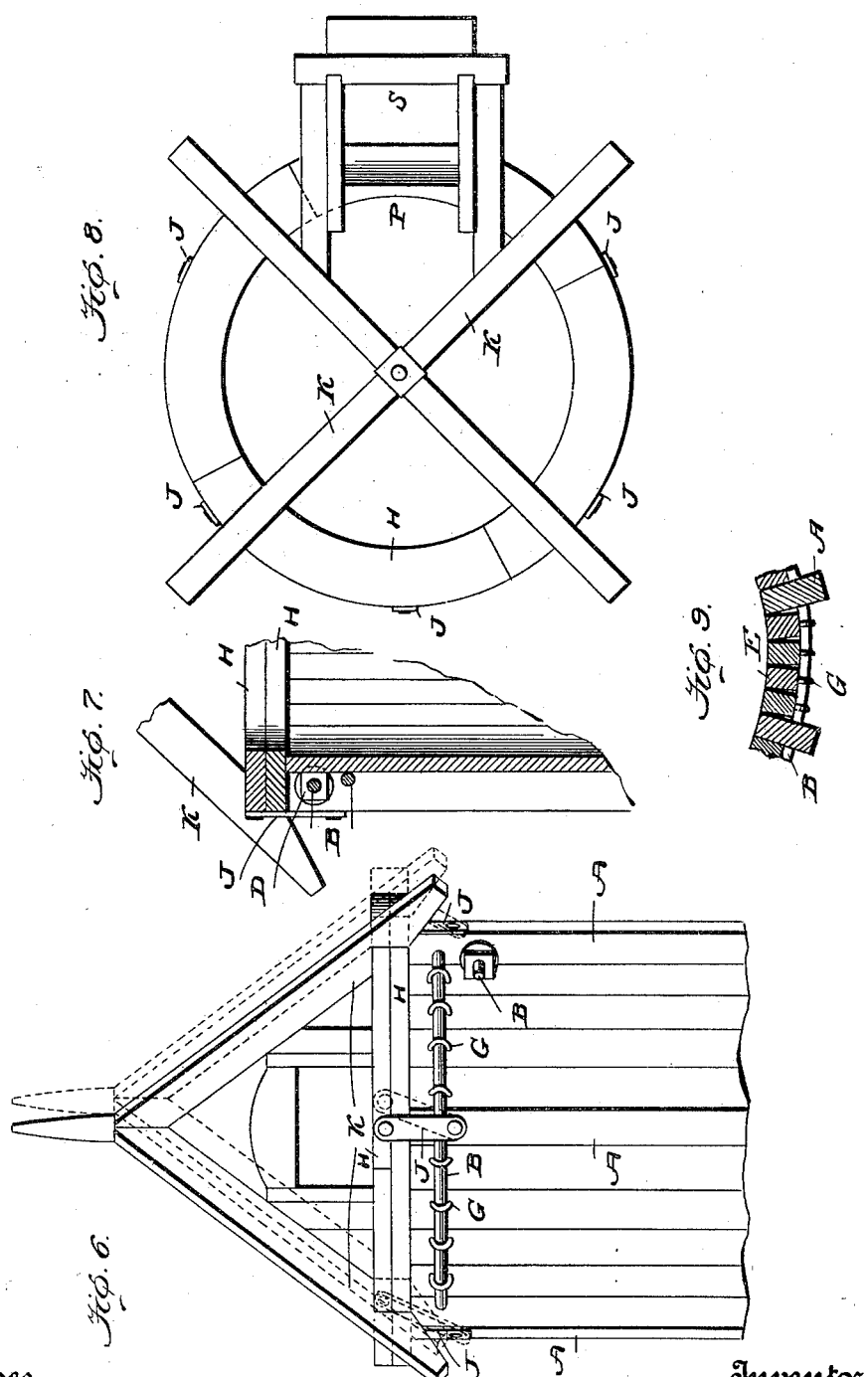
Witnesses
Inventor
Stephen P. White
by Attorney

UNITED STATES PATENT OFFICE.

STEPHEN P. WHITE, OF PULASKI, TENNESSEE.

SILO.

SPECIFICATION forming part of Letters Patent No. 699,602, dated May 6, 1902.

Application filed April 26, 1901. Serial No. 57,560. (No model.)

*To all whom it may concern:*

Be it known that I, STEPHEN P. WHITE, a citizen of the United States, residing at Pulaski, in the county of Giles and State of Tennessee, have invented certain new and useful Improvements in Silos, of which the following is a specification, reference being had therein to the accompanying drawings.

My invention relates to improvements in silos; and one object of my invention is the provision of a silo which can be constructed at a comparatively low cost and which will be very durable.

Another object of my invention is the provision of a silo which will preserve the ensilage in a perfect condition and which will prevent damaging influence from the weather by being air and water tight.

Another object of my invention is the provision of a silo which can be easily and quickly constructed and which will be thoroughly efficient and practical for the intended purpose.

With these objects in view my invention consists of a silo embodying novel features of construction and combination of parts substantially as disclosed herein.

Figure 1 represents a side view of my improved silo complete, the outer doors being shown open to show the inner openings and tight-fitting doors therefor. Fig. 2 represents a perspective view of the main frame or skeleton of my silo. Fig. 3 represents a horizontal sectional view of my silo, taken through one of the doors. Fig. 4 represents a detail view of a portion of the top to show my novel construction to prevent the same from interfering with the expansion and contraction of the timber of the body portion of the silo. Fig. 5 represents a detail view of a portion of the staves to show the air-tight connection of same. Figs. 6, 7, and 8 represent enlarged detail views of the upper portion and cap or tops of my silo. Fig. 9 is a sectional detail showing the outer edges of the staves flaring.

Referring by letter to the drawings, A designates the main vertical supports or standards of my frame, which are secured firmly together by the curved binding-rods B, which pass adjustably through openings C in the standards and at each end are threaded to receive clamping-nuts D. Between the skeleton frame thus formed I place the staves E, which are of rectangular form in cross-section and are connected at their adjacent meeting edges by the plates F, as seen in Fig. 5, which make the staves air-tight at their meeting edges, and the clamping-rods serve to bring the inner edges of the staves together and make a perfectly tight joint, but allow the outer edges of the staves to spread apart, as seen in Fig. 9, thus permitting the air to enter and dry out the staves and prevent decay, and the staves are secured to the rods preferably by means of staples or like fastenings G. To the body portion thus formed I apply the independent cap or top, which has the base made of a series of overlapping sections H, breaking joint, as shown in Fig. 4, secured by plates J to the body, and to the base are connected the rafters K, which support the roof L, made of suitable material, which will not be materially affected by the weather. The overlapping sections rest loosely upon each other, so as to permit of the necessary play, the upper sections moving with the roof. By this construction it will be seen that the contraction or expansion of the staves will not in the least affect the base of the roof, nor will the action upon the roof affect the body, the pivotal plates allowing for such expansion and contraction of either the roof or body without affecting the other. The top of the silo is provided with a window M, which receives the silage which falls into the silo and affords light for the upper part of the building. On one side is formed a series of openings N, which have their walls beveled, as at O, to receive the air-tight-fitting doors P, and extending vertically and adjacent to the said openings N is the chute Q, which is provided with a series of openings R in line with the openings N and provided with hinged doors S, the purpose of which is to permit access to the various parts of the silo as the ensilage is used, and to enable a person to reach the openings I provide the ladder T for enabling entry to the silo.

It will be understood that I provide a silo which will keep the ensilage in a fresh and wholesome condition at all times and which can be quickly and inexpensively constructed and which will have a long life by being free from decay under the influence of the weather. It will also be seen that the tightening-hoops are secured firmly to the staves and that they can be easily tightened or adjusted and that the staves will quickly dry and not decay.

I claim—

1. A silo consisting of the body portion, the roof and the base of the roof connected to the top of the body and composed of a series of overlapping sections.

2. A silo composed of the body made up of the main supports and staves bound together air-tight, the roof and the base of the roof made of sections and connected to the top of the body.

3. The silo herein shown and described, consisting of the vertical standards or supports, the rectangular strips interposed between said supports and having their inner edges meeting snugly, the segmental rods passing through the supports and interposed strips to bind the inner edges of the strips and supports firmly together and leave the outer edges open or flaring, the top portion mounted upon the body and consisting of the series of overlapping curved strips secured together and permitting contraction and expansion, the top or cap secured upon said top portion, and the doors in the body and top to permit access to the silo.

4. The silo herein shown and described, consisting of the vertical supports, the interposed rectangular strips having their inner edges meeting and their outer edges apart, means for clamping the supports and strips firmly together, said strips being made in sections secured together to permit contraction and expansion, the inlets in the body, the vertical chute adjacent to said inlets, the doors in the inlets of the body and chute, and a top portion secured to the body to have a slight movement or play.

In testimony whereof I affix my signature in presence of two witnesses.

STEPHEN P. WHITE.

Witnesses:
C. R. JONES,
J. B. ROBERTS.